United States Patent
Kuno

(10) Patent No.: US 8,583,951 B2
(45) Date of Patent: Nov. 12, 2013

(54) VIDEO/AUDIO PROCESSING DEVICE AND APPARATUS CONNECTED TO THE SAME

(75) Inventor: Yoshiki Kuno, Osaka (JP)

(73) Assignee: Panasonic Corporation, Osaka (JP)

(*) Notice: Subject to any disclaimer, the term of this patent is extended or adjusted under 35 U.S.C. 154(b) by 1233 days.

(21) Appl. No.: 11/918,244

(22) PCT Filed: Mar. 30, 2006

(86) PCT No.: PCT/JP2006/306685
§ 371 (c)(1),
(2), (4) Date: Oct. 11, 2007

(87) PCT Pub. No.: WO2006/109581
PCT Pub. Date: Oct. 19, 2006

(65) Prior Publication Data
US 2009/0041438 A1    Feb. 12, 2009

(30) Foreign Application Priority Data
Apr. 12, 2005    (JP) .................................. 2005-114140

(51) Int. Cl.
*G06F 1/32*    (2006.01)
(52) U.S. Cl.
CPC .................................... *G06F 1/3203* (2013.01)
USPC ........... 713/321; 713/300; 713/320; 713/323; 725/9; 725/14
(58) Field of Classification Search
CPC .................................................... G06F 1/3203
USPC .......... 386/200, 231, 263, 248; 713/300, 321, 713/324; 725/9, 14, 37, 38, 105, 109, 110, 725/134, 135, 139–143; 345/211
See application file for complete search history.

(56) References Cited

U.S. PATENT DOCUMENTS 5,097,249 A * 3/1992 Yamamoto ............... 340/538.17
5,784,628 A    7/1998 Reneris
(Continued)

FOREIGN PATENT DOCUMENTS

DE    31 05 536    12/1981
EP    1 087 293    3/2001
(Continued)

OTHER PUBLICATIONS

Supplementary European Search Report issued May 8, 2009 in the European Application No. EP 06 73 0633.

(Continued)

*Primary Examiner* — Hung Dang
*Assistant Examiner* — Mishawn Dunn
(74) *Attorney, Agent, or Firm* — Wenderoth, Lind & Ponack, L.L.P.

(57) ABSTRACT

A video/audio processing device, such as a DVD recorder, includes a controller for controlling a state of power-on/off. The controller has a first standby mode and a second standby mode having power consumption larger than that of the first standby mode in a power-off state of the video/audio processing device. The first standby mode is a mode for maintaining a power of the video/audio processing device in the "off" state. The second standby mode is a mode for maintaining the power of the video/audio processing device in an apparent "off" state. The controller switches between the first standby mode and the second standby mode in conjunction with a state of power-on/off of external equipment such as television.

2 Claims, 13 Drawing Sheets

(56) References Cited

U.S. PATENT DOCUMENTS

| | | | |
|---|---|---|---|
| 5,862,437 A | 1/1999 | Kutsuwada et al. | |
| 2002/0036910 A1* | 3/2002 | Yang | 363/21.07 |
| 2002/0138669 A1* | 9/2002 | Kadatch et al. | 710/5 |
| 2004/0041903 A1 | 3/2004 | Drexler et al. | |
| 2004/0078610 A1 | 4/2004 | Naitoh | |
| 2004/0107418 A1 | 6/2004 | Suda et al. | |
| 2004/0194084 A1 | 9/2004 | Matsunami et al. | |
| 2005/0073518 A1* | 4/2005 | Bontempi | 345/211 |
| 2005/0229226 A1* | 10/2005 | Relan et al. | 725/114 |
| 2006/0109384 A1 | 5/2006 | Miller-Smith et al. | |
| 2010/0275225 A1* | 10/2010 | Nielsen et al. | 725/14 |

FOREIGN PATENT DOCUMENTS

| | | |
|---|---|---|
| EP | 1 211 895 | 6/2002 |
| EP | 1 424 629 | 6/2004 |
| GB | 2 384 926 | 8/2003 |
| JP | 56-115082 | 9/1981 |
| JP | 6-6496 | 1/1994 |
| JP | 6-180894 | 6/1994 |
| JP | 9-106225 | 4/1997 |
| JP | 2000-195243 | 7/2000 |
| JP | 2000-270131 | 9/2000 |
| JP | 2001-45193 | 2/2001 |
| JP | 2001-111732 | 4/2001 |
| JP | 2001-159979 | 6/2001 |
| JP | 2001-188442 | 7/2001 |
| JP | 2003-150282 | 5/2003 |
| JP | 2004-120365 | 4/2004 |
| JP | 2004-185096 | 7/2004 |
| JP | 2004-349790 | 12/2004 |
| WO | 2004/057862 | 7/2004 |

OTHER PUBLICATIONS

International Preliminary Report on Patentability issued Aug. 21, 2008 in the International (PCT) Application No. PCT/JP2006/306685.

International Search Report of May 2, 2006 issued in the International Application No. PCT/JP2006/306685.

Summons to Attend Oral Proceedings issued Jan. 14, 2013 in corresponding European Application No. 06 730 633.2.

"Free-to-Air" Digital Set Top Boxes (STBS); Standby Product Profile Mar. 2003; Mar. 2004; Australia's Standby Power Strategy 2002-2012; URL: http://www.energyrating.gov.au/wp-content/uploads/Energy_Rating_Documents/Product_Profiles/Home_Entertainment/Set_Top_Boxes/sb200403-stbs.pdf.

Alan Meier et al.; "Results from the Investigations on Leaking Electricity in the USA"; Lawrence Berkeley National Laboratory; Oct. 1997; URL: http://escholarship.ucop.edu/uc/item/3t79j078.

Paul Ryan; "MEPS Product Profile: Digital Set Top Boxes"; EnergyConsult Pty. Ltd.; Oct. 2004; URL: http://www.energyrating.gov.au/wp-content/uploads/Energy_Rating_Documents/Library/Home_Entertainment/Set_Top_Boxes/2004mepsw2-ryan.pdf.

Karen B. Rosen et al.; "Energy Use of Set-top Boxes and Telephony Products in the U.S."; University of California Berkeley; Jun. 2001; URL: http://www.herterenergy.com/pdfs/Publications/LBL45305.pdf.

\* cited by examiner

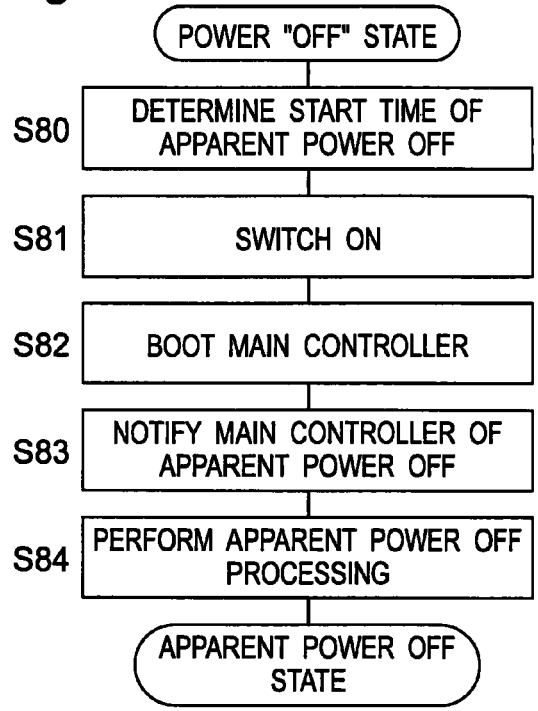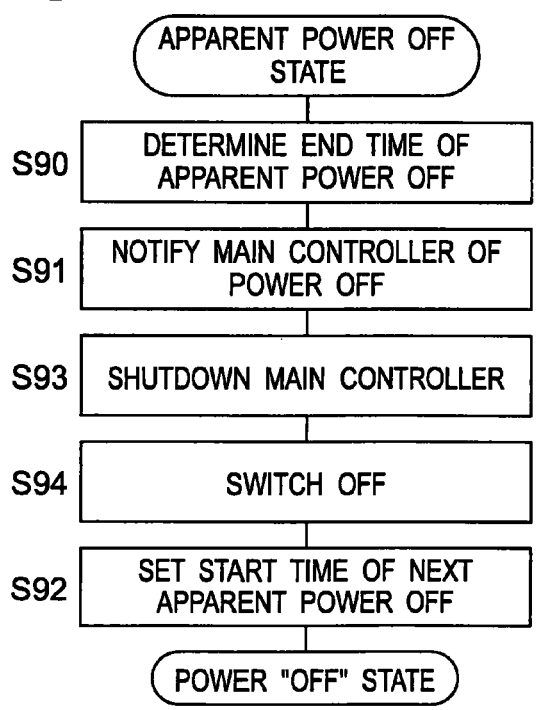

VIDEO/AUDIO PROCESSING DEVICE AND APPARATUS CONNECTED TO THE SAME

BACKGROUND OF THE INVENTION

1. Technical Field

The present invention relates to a video/audio processing device, such as a hard disk recorder and a DVD recorder, having a function of programmed-recording for television broadcast.

2. Background Art

In recent years, widespread use of household electrical appliances equipped with digital technique has been remarkable. In particular, DVD (Digital Versatile Disc) recorders with hard discs have been rapidly widespread and the number of manufacturers newly entering into the market has been increasing. It has been recently accelerated to make the DVD recorders multifunctional, increasing power consumption thereof. Processing contents of a system have been required to be as complicated as those of a personal computer, and power consumption tends to be increased. Such household electrical appliances have also been required to give consideration to the Earth environment. Necessity for reducing power consumed by the appliances becomes higher.

An example of a conventional DVD recorder is disclosed in Patent Document 1. In this example, the DVD recorder is composed of a PVR unit including a main CPU for mainly performing recording/reproducing processing, a DVD unit for reading from and writing to a DVD recording medium, a sub-CPU for controlling power supply to the PVR unit and the DVD unit, and a real time clock (hereinafter, referred to as an "RTC") for counting time with which a programmed recording function is realized. When the DVD recorder is in a programmed recording standby state (a standby state until programmed recording start time while programmed contents of a program to be recorded are being held), power supply to the PVR unit including the main CPU and the DVD unit is not performed. Therefore, Power consumption in the programmed recording standby state can be reduced.

Patent Document 1: JP-A-2004-120365

In the above-described configuration, the DVD recorder is started by depressing the power button of a remote controller or the body of the DVD recorder by the user, it takes time from a few to tens of seconds for start. This is because it takes long time to load the system program of the DVD recorder into the memory of the main CPU of the system or to start the DVD drive. To shorten the start time, power is considered to be supplied to all blocks all the time. In this case, energizing time and the number of energized portions are increased, and thus power consumption during standby can be increased.

The present invention has been made to solve the above problems, and has an object to provide a video/audio processing device that can reduce power consumption during standby.

SUMMARY OF THE INVENTION

In a first aspect of the present invention, a video/audio processing device for processing video and/or audio signals is provided. The video/audio processing device includes a controller for controlling a state of power-on/off of the video/audio processing device. The controller has a first standby mode, and a second standby mode that has power consumption larger than that of the first standby mode, in a power-off state of the video/audio processing device.

The controller may switch between the first standby mode and the second standby mode in conjunction with a state (for example, state of power supply) of external equipment connected to the video/audio processing device.

The controller may learn the power-on time and the power-off time from user's operation and switch between the first standby mode and the second standby mode based on the learned power-on time and power-off time.

The controller may switch between the first standby mode and the second standby mode in conjunction with start or end of download of software.

In a second aspect of the invention, Equipment connectable to a video/audio processing device is provided. The video/audio processing device can be controlled to one of a first standby mode and a second standby mode having power consumption larger than that of the first standby mode in a power-off state in conjunction with an output signal from the equipment. The equipment outputs information on a state of the equipment as an output signal to the video/audio processing device.

According to the present invention, as the standby mode in the power "off" state, aside from the first standby mode (operation mode that maintains the video/audio processing device in the normal power "off" state), the second standby mode having power consumption larger than that of the first standby mode (operation mode that maintains the video/audio processing device in the "apparent power-off" state) is prepared. The first and second standby modes are switched in conjunction with the external equipment. Power consumption during standby can be reduced.

BRIEF DESCRIPTION OF DRAWINGS

FIG. 14 is a diagram showing a procedure for changing the recording/reproducing apparatus according to Embodiment 4 of the present invention from the power "off" state to the "apparent power-off" state.

FIG. 15 is a diagram showing a procedure for changing the recording/reproducing apparatus according to Embodiment 4 of the present invention from the "apparent power-off" state to the power "off" state.

DESCRIPTION OF REFERENCE SIGNS

Figure 1:
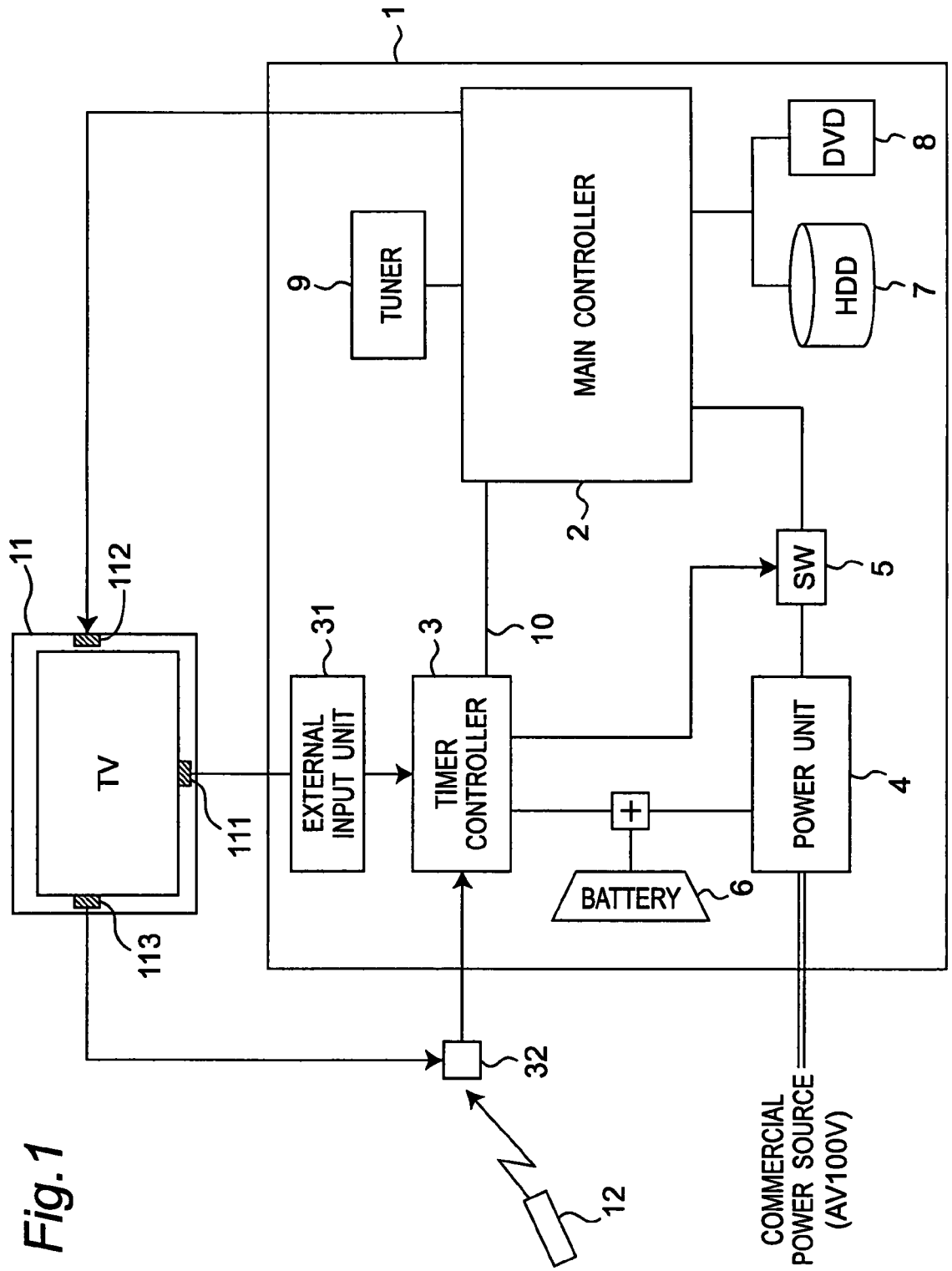
FIG. 1 is a block diagram of the entire system including connection between a recording/reproducing apparatus of the present invention and television.

1 Recording/reproducing apparatus
2 Main controller
3 Timer controller
4 Power unit
5 Switch
6 Battery unit
7 HDD (Hard Dick Drive)
8 DVD drive
9 Tuner
10 Communication unit
11 Television
12 Remote controller
13 Net interface (I/F)
14 Lighting equipment
15 Digital tuner
31 External input unit
32 IR input unit
33 Illumination detector
111 Monitor output
112 Video input unit
113 IR output unit
114 Net terminal unit

DETAILED DESCRIPTION OF THE INVENTION

Embodiments of the present invention are described below with reference to the accompanying drawings. In the description of the following embodiments, a video/audio processing device (AV device) for processing a video signal and/or an audio signal is described with a recording/reproducing apparatus taken as an example.

In the description of the following respective embodiments, a power "on" state refers to a state in which power is fully supplied to the apparatus for a normal operation, while a power "off" state refers to a standby state in which minimum power required for receiving a signal from a remote controller is supplied. The terms "power-on" and the "power-off" mean state of power supply of the apparatus which is seen from users, or mean user operation. In the present invention, a "first standby mode" of the apparatus means the power "off" state, and a "second standby mode" means the "apparent power-off" state (described later in detail). When seen from the user, both of the states are power-off state of the device.

Embodiment 1

Embodiment 1 of the present invention is described below. In the following description, a television, for example, is used for an external equipment. FIG. 1 is a block diagram of the entire system, focusing on a power control system of the recording/reproducing apparatus of Embodiment 1 of the present invention.

1. System Configuration

A main controller 2 in a recording/reproducing apparatus 1 performs main processing as a device for recording/reproducing, such as recording and reproducing processing in the recording/reproducing apparatus 1. A timer controller 3 performs clock-processing for power control to the main controller 2, reception of a remote controller signal, and programmed recording. An external input unit 31 is means for inputting an external video or audio signal to the timer controller 3. An IR input unit 32 inputs an infrared signal ("IR signal") of the remote controller to the timer controller 3.

A power unit 4 supplies direct-current power from commercial power source of AC 100V to the timer controller 3 and the main controller 2. A switch 5 controls supply/stop of power to the main controller 2 based on a command from the timer controller 3. A battery 6 supplies power to the timer controller 3 instead of the power unit 4, when the power unit 4 cannot supply power to the timer controller 3 due to a power failure and so on. A hard disk drive ("HDD") 7 stores and reproduces a recorded program under control of the main controller 2. A DVD drive 8 dubs the program recorded on the HDD 7 to a DVD medium, or reproduces the program recorded on the DVD medium under control of the main controller 2. A tuner 9 receives a broadcast wave inputted from an antenna (not shown) and selects a desired channel to output its video and audio signals to the main controller 2. Communication unit 10 is means for achieving mutual communication between the timer controller 3 and the main controller 2.

The recording/reproducing apparatus 1 is connected to a television 11. The television 11 receives a broadcast wave inputted from the antenna (not shown) and selects a desired channel to reproduce its video and audio signals.

The television 11 has a monitor output unit 111 for outputting video and audio signals of the currently selected channel. The monitor output unit 111 is connected to the external input unit 31 of the recording/reproducing apparatus 1. Video and audio signals are inputted from the television 11 to the external input unit 31. The television 11 has a video input unit 112 for inputting video and audio signals from the recording/reproducing apparatus 1. The television 11 has an IR output unit 113 for outputting the IR signal for controlling the recording/reproducing apparatus 1.

A remote controller 12 controls the recording/reproducing apparatus 1 with the IR signal. The remote controller 12 can also control the television 11.

1.1 Main Controller

Figure 2:
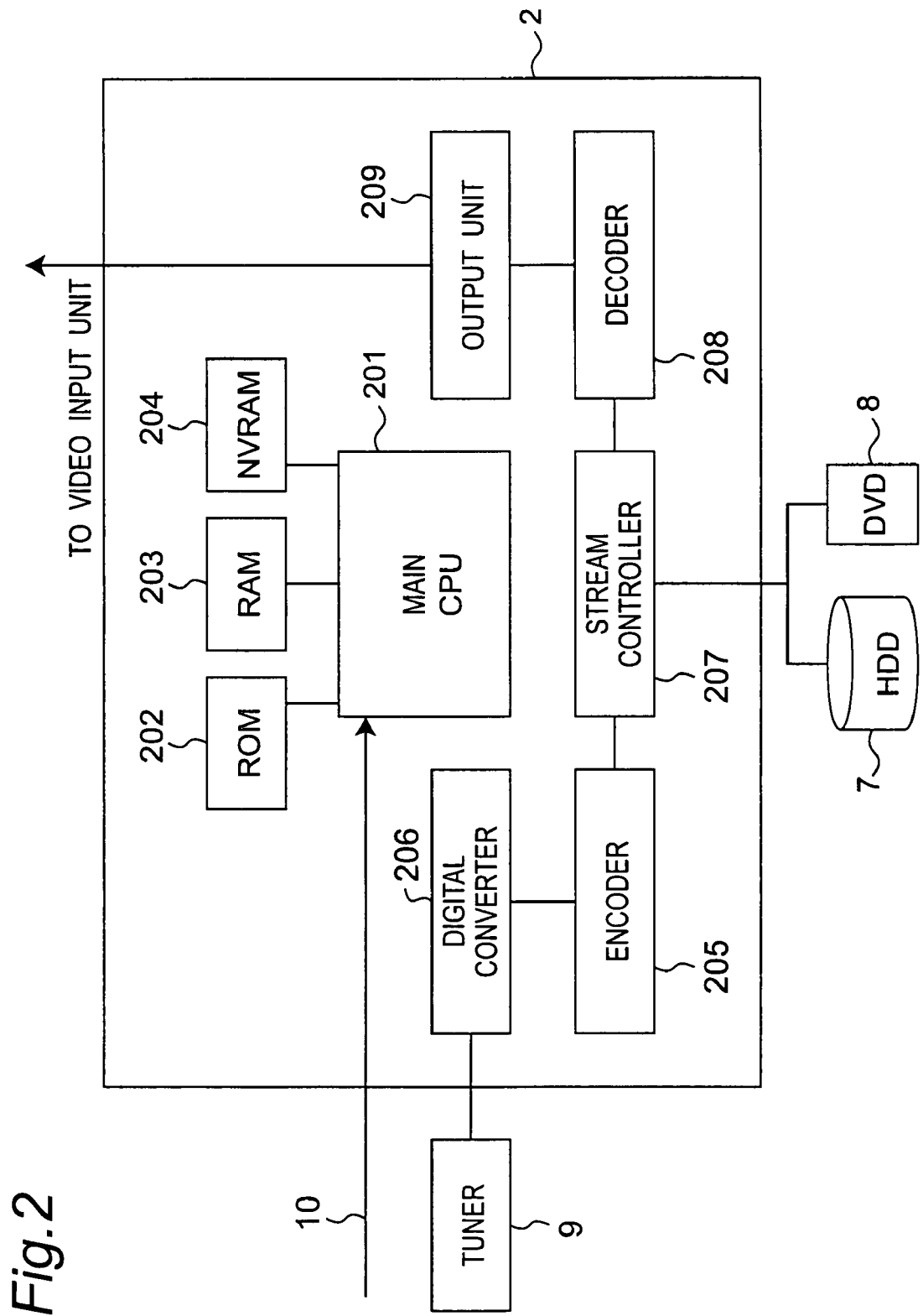
FIG. 2 is a block diagram of a main controller 2 in the recording/reproducing apparatus of the present invention.

The detailed configuration of the main controller 2 is described with reference to FIG. 2. A main CPU 201 of the main controller 2 executes a main program to control the processing units in the main controller 2. The main CPU 201 is connected to the communication unit 10 and communicates with the timer controller 3.

NVRAM 204 stores the main program executed by the main CPU 201. The NVRAM 204 stores management information necessary for operation of the recording/reproducing apparatus, and information to be updated such as initial setting information. The NVRAM 204 can be realized by a flash memory.

A RAM 203 is used as a work memory in order for the main CPU 201 to execute software processing. The main program stored in the NVRAM 204 is loaded into the RAM 203 to accelerate the processing speed of software on the main CPU 201. The RAM 203 is used as a buffer memory for stream data to be inputted to or outputted from a stream controller 207 which is described later.

A ROM 202 boots the main CPU 201 and stores a program for executing minimum processing required for loading the main program stored in the NVRAM 204 into the RAM 203.

A digital converter 206 converts analog video and audio signals outputted from the tuner 9 to digital signals, respectively. An encoder 205 compresses the digital-converted video and audio signals, respectively, and then outputs as a video and audio multiplexed stream. The stream controller 207 records the compressed stream to the HDD 7. The stream controller 207 also reads the stream recorded in the HDD 7 and the DVD drive 8. The stream controller 207 can also duplicate or move the stream recorded on the HDD 7 to the DVD drive 8. A decoder 208 develops the stream data read from the stream controller 207 and then outputs the extended digital video and audio signals.

An output unit 209 synthesizes graphics data generated by the main CPU 201 with an output from the decoder 208. The output unit 209 converts the synthesized digital video/audio signal to an analog signal and output it to the video input unit 112 of the television 11. The television 11 presents video received via the video input unit 112 on the screen with audio.

According to the above-described configuration of the main controller 2, it is possible to realize basic functions of the recording/reproducing apparatus, such as recording on the HDD 7 the video and audio signals received at the tuner 9 as a compressed digital stream, reproducing of the stream recorded on the HDD 7 or the DVD drive 8, displaying of a menu and an operation screen, and dubbing of the stream from the HDD 7 to the DVD drive 8.

In the configuration of the present embodiment, the compressed stream data can be directly recorded on the DVD drive 8. In place of the DVD drive 8, a device for recording/reproducing data to/from a BD (Blu-ray Disk (*registered trade mark)) may be used.

2. Power-on/Off State of Recording/Reproducing Apparatus

The recording/reproducing apparatus 1 of the present embodiment can be controlled to the following state for power supply.

Power "on" state: A state in which power is fully supplied to the recording/reproducing apparatus for normal operation.

Power "off" state: A state in which minimum power required for receiving a signal from the remote controller is supplied to the recording/reproducing apparatus.

Apparent power-off state: A state in which the recording/reproducing apparatus appears to be powered or turned "off", when seen from the user, but power is fully supplied to the recording/reproducing apparatus, as in the power "on" state Apparent power-on state: A state in which the recording/reproducing apparatus appears to be powered or turned "on". A video signal is outputted to the external equipment via the output unit 209. Boot processing of the main controller 1 and start processing of the HDD 7 and the DVD drive 8 are not performed.

As described above, in the apparent power-off state, power is fully supplied to the recording/reproducing apparatus, as in the normal power "on" state. In this state, no video and audio signals are outputted from the output unit 209 of the recording/reproducing apparatus 1 to the external equipment. The television 11 presents no video and audio. The power of the recording/reproducing apparatus is apparently off, when seen from the user.

Figure 3:
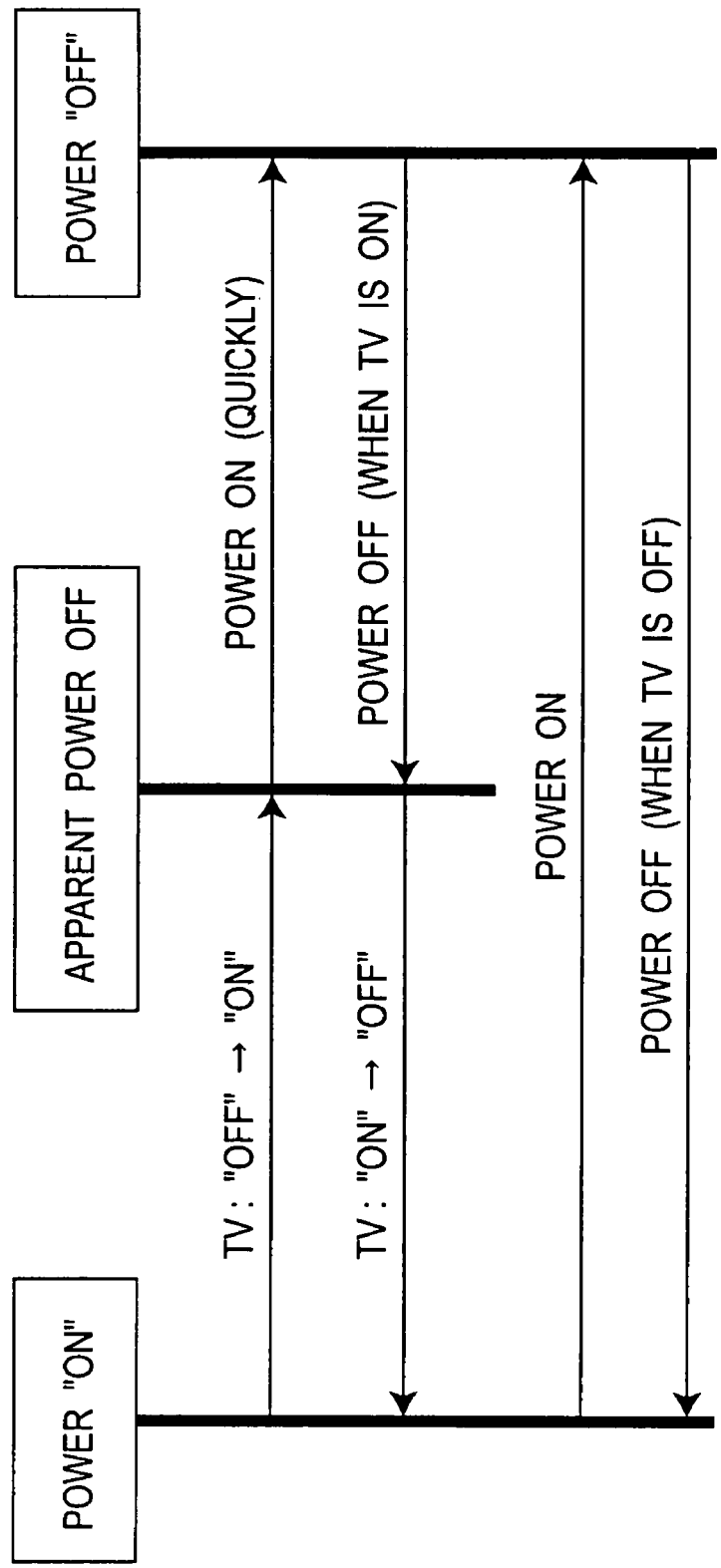
FIG. 3 is a diagram showing transition among power "off" state, "apparent power-off" state, and power "on" state of the recording/reproducing apparatus of the present invention.

As shown in FIG. 3, the recording/reproducing apparatus 1 of the present embodiment in the power "off" state can transfer to the apparent power-off state or the power "on" state, and the recording/reproducing apparatus 1 in the power "on" state can transfer to the apparent power-off state or the power "off" state.

More specifically, when the recording/reproducing apparatus 1 is in the power "on" state, the television 11 connected to the recording/reproducing apparatus 1 is in the power "on" state, and user instructs the recording/reproducing apparatus 1 to be powered off, the recording/reproducing apparatus 1 transfers to the "apparent power-off" state. When the recording/reproducing apparatus 1 is in the power "on" state, the television 11 is in the power "off" state, and the user instructs the recording/reproducing apparatus 1 to be powered off, the recording/reproducing apparatus 1 transfers to the power "off" state. During the power "off" state of the recording/reproducing apparatus 1, standby energy can be suppressed to the same degree as the conventional recording/reproducing apparatus.

When the recording/reproducing apparatus 1 is in the power "off" state and the television 11 transfers from the power "off" state to the power "on" state, the recording/reproducing apparatus 1 transfers to the apparent power-off state. When the recording/reproducing apparatus 1 is in the power "off" state and the user instructs the apparatus 1 to be powered on, it transfers to the power "on" state. This is the same as the conventional art.

When the recording/reproducing apparatus 1 is in the apparent power-off state and the television 11 transfers from the power "on" state to the power "off" state, the recording/reproducing apparatus 1 transfers to the power "off" state. When the recording/reproducing apparatus 1 is in the apparent power-off state and is powered on by the user, it transfers to the power "on" state. In this case, fast power-on operation can be realized.

3. Operation of Recording/Reproducing Apparatus

Operations of the recording/reproducing apparatus 1 as configured above are described below.

3.1 Normal Power-on Processing

Figure 4:
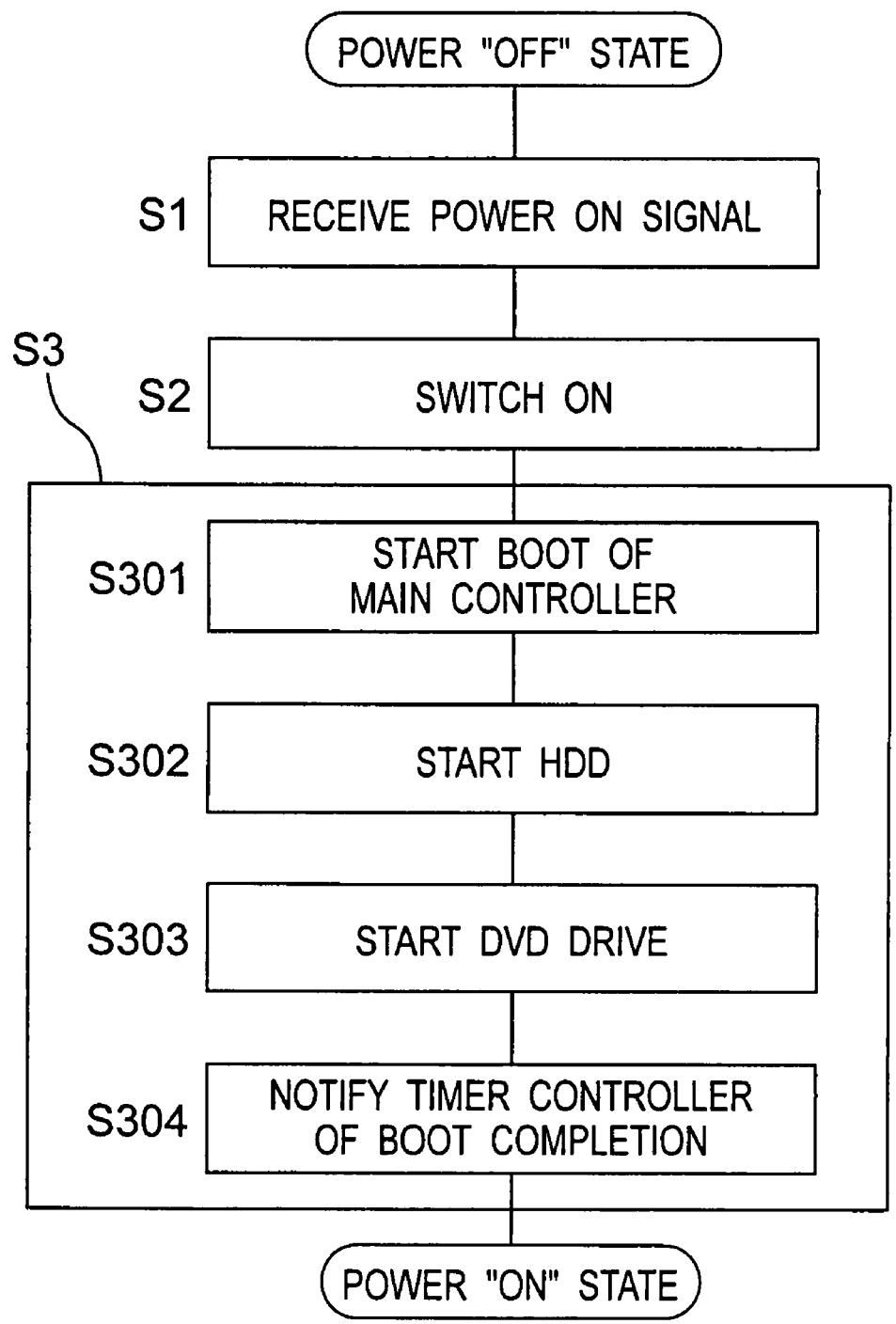
FIG. 4 is a diagram showing a procedure for changing the recording/reproducing apparatus of the present invention from the power "off" state to the power "on" state.

Normal power-on processing when the recording/reproducing apparatus 1 transfers from the power "off" state to the power "on" state is described with reference to FIG. 4.

During the power "off" state of the recording/reproducing apparatus 1, when a power button provided on the remote controller 12 or a body of the recording/reproducing apparatus is depressed, a power signal is transmitted to the IR input unit 32. Since the recording/reproducing apparatus 1 is in the power "off" state, the IR input unit 32 receives the power signal as a power-on signal (S1). The timer controller 3 turns on the switch 5 based on the power-on signal (S2). The switch 5 is turned on, and it causes power to be supplied from the power unit 4 to the main controller 2.

Then, boot of the main controller 2 is executed (S3). Specifically, when the switch 5 is turned on, power is supplied to the main controller 2 to start boot of the main controller 2 (S301). At the same time, the HDD 7 is started (S302) and the DVD drive 8 is started (S303).

In the start of the HDD 7, the power is supplied to the HDD 7 to spin a disk up. The recording/reproducing apparatus performs processing such as reading of management information of the disc. The power is also supplied to the DVD drive 8. When the disk is loaded to the DVD drive 8, the disk is spun up and the recording/reproducing apparatus performs processing such as reading of management information of the disk (including disk type). When the disk is not loaded, only power supply and initialization processing of the drive are executed.

Then, the main controller 2 is booted to execute the main program which is loaded from the NVRAM 204 to the RAM 203, and power-on processing of the main controller 2 is then executed. Power-on processing is processing for changing the state by the main program to the states in which an inner state is managed as the power-on state, or processing for supplying video and audio signals of the tuner 9 to the output unit 209 so as to display the start state of the recording/reproducing apparatus 1 on the television 11. The recording/reproducing apparatus body may be provided with a display panel to display the power "on" state on the display panel.

When the power-on processing is completed, the main controller 2 notifies the timer controller 3 of boot completion (S304). Hence, the recording/reproducing apparatus 1 becomes in the power "on" state.

As described above, in the present embodiment, normal power-on processing need to transfer the main program from the NVRAM 204 to the RAM 202 for boot processing of the main controller 2. It takes long time for the transfer. If the program is directly executed from the NVRAM 204, it takes long time to access the NVRAM 204 from the main CPU 201. The processing speed of the program extremely goes down. The transfer processing of the program from the NVRAM 204 to the RAM 202 is necessary for securing the performance of the CPU. According to the present embodiment, in the start processing of the main program, it also takes long time to start the operating system and to initialize the driver and middleware. In the present embodiment, it takes long time for HDD start processing and DVD drive start processing. Thus, in the entire system, it takes very long time to transfer from the power "off" state to the power "on" state in the normal power-on sequence. To solve the above problem for the processing time, according to the present embodiment, the apparent power-off state is provided to realize fast power-on processing. The detail is described later.

3.2 Power-Off Processing

Power-off processing is described with reference to FIG. 5. As described above, when the recording/reproducing apparatus 1 is in the power "on" state and the user gives a command for power off, the apparatus 1 transfers to either the "power off" state or the "apparent power-off" state according to the state of power-on/off of the television 11.

Figure 5:
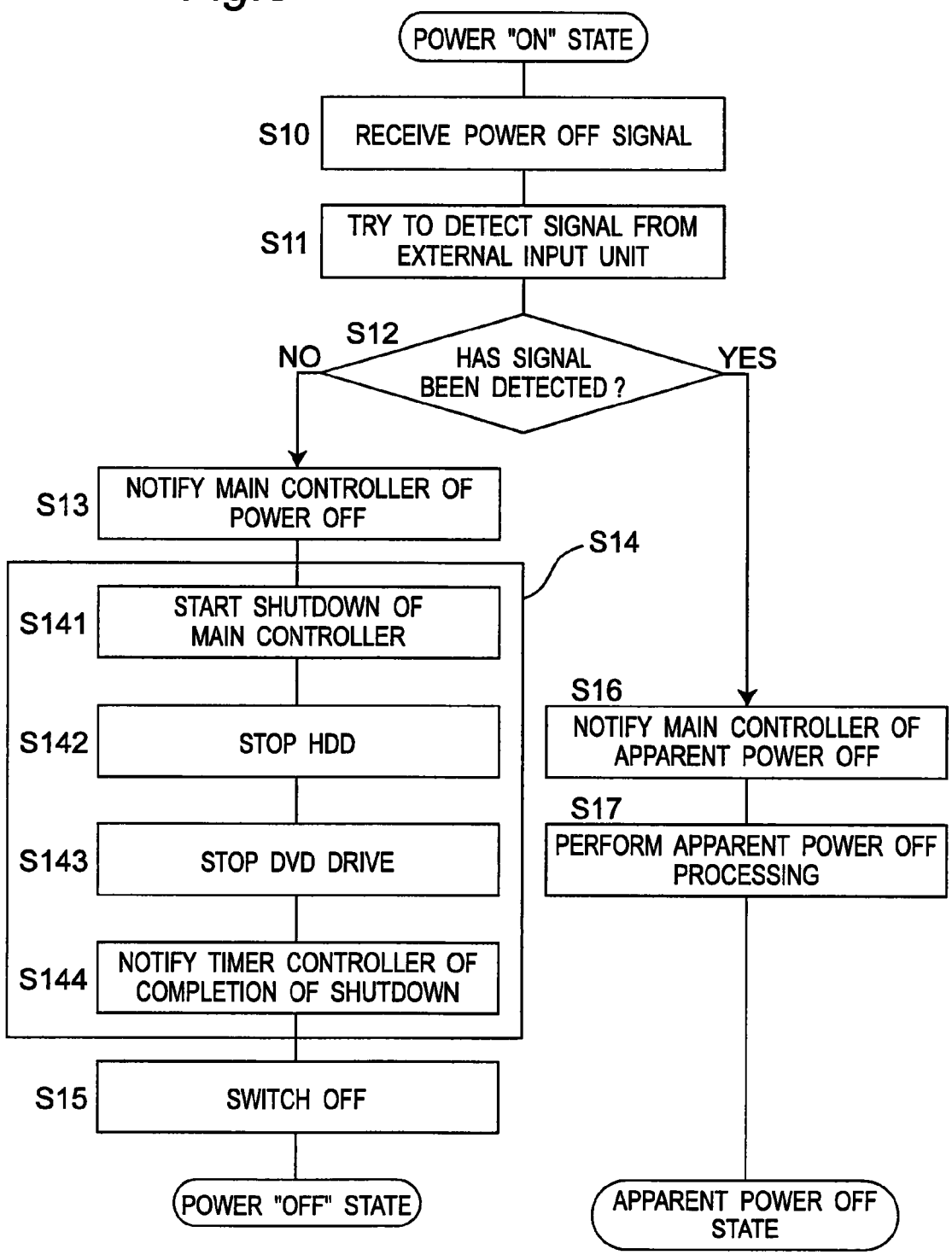
FIG. 5 is a diagram showing a procedure for changing the recording/reproducing apparatus of the present invention from the power "on" state to the power "off" state or the apparent power-off state.

Referring to FIG. 5, in the power "on" state, when the power button of the remote controller 12 or the recording/reproducing apparatus body is depressed, the power signal is transmitted to the IR input unit 32. Since the recording/reproducing apparatus 1 is in the power "on" state, the IR input unit 32 receives the power signal as a "power-off signal" (S10). In order for the timer controller 3 to judge whether to perform normal power-off processing, the external input unit 31 detects the presence or absence of input signals (S11). Video and audio signals from the television 11 are inputted to the external input unit 31. Therefore, when the television 11 is in the power "off" state, no input signal is detected by the external input unit 31.

When no inputs of video and audio signals are detected by the external input unit 31, that is, the television 11 is in the power "off" state (NO in S12), the main controller 2 is notified of power-off (S13). Then shutdown of the main controller 2 is executed (S14). Specifically, upon reception of the notification of power-off from the timer controller 3, the main controller 2 starts shutdown (S141). When there is an opened file on the HDD 7, necessary information is stored or written and then the file is closed. Further management information of the disk is updated or management information of the recording/reproducing apparatus 1 is written to the NVRAM 204. Then the HDD 7 is controlled to spin down and the power supply to the HDD 7 is stopped (S142). When the disk is loaded into the DVD drive 8 and there is an opened file, necessary information is stored or written and then the file is closed. Management information of the disk is updated. After that, the DVD drive 8 is controlled to spin down and the power supply to the DVD drive 8 is stopped (S143). When the disk is not loaded into the DVD drive 8, the power supply to the DVD drive 8 may be simply stopped.

The main controller 2 then performs power-off processing. Power-off processing is processing in which the main program changes the states so that the inner state is managed as the power-off state and mutes video and audio of the output unit 209. The recording/reproducing apparatus body may be provided with a display panel and may display the power "off" state on the display panel. When power-off processing is completed, the main controller 2 notifies the timer controller 3 of shutdown completion (S144). Upon reception of this, the timer controller 3 turns off the switch 5 (S14). Thus the power supply to the main controller 2 is shut down. By the above procedure, the recording/reproducing apparatus of the present invention becomes in the power "off" state.

On the other hand, in step S12, inputs of video and audio signals are detected by the external input unit 31, that is, the television 11 is in the power "on" state (YES in S12), the timer controller 3 notifies the main controller 2 of "apparent power-off" (S16). Thus, the main controller 2 performs "apparent power-off" processing (S17). "Apparent power-off" processing is processing in which the recording/reproducing apparatus 1 is apparently powered off, when seen from the user, that is: indication for power is displayed "off"; the display panel of the recording/reproducing apparatus body is controlled to be state as in the power-off state; and the recording/reproducing apparatus 1 is controlled so that the recording/reproducing apparatus 1 does not accept when accepting any buttons other than the power button provided on the remote controller or the recording/reproducing apparatus body. Hence the recording/reproducing apparatus 1 becomes in the "apparent power-off" state.

As described above, when the recording/reproducing apparatus 1 is powered off by the user, and if the television 11 is in the power "off" state, the recording/reproducing apparatus 1 transfers to the power "off" state. If the television 11 is in the power "on" state, the recording/reproducing apparatus 1 transfers to the "apparent power-off" state. The recording/reproducing apparatus 1 transferring to the "apparent power-off" state can realizes fast power-on processing of the apparatus 1 upon receiving power-on operation of the user.

3.3 Transfer from Power "Off" State to "Apparent Power-Off" State

Figure 6:
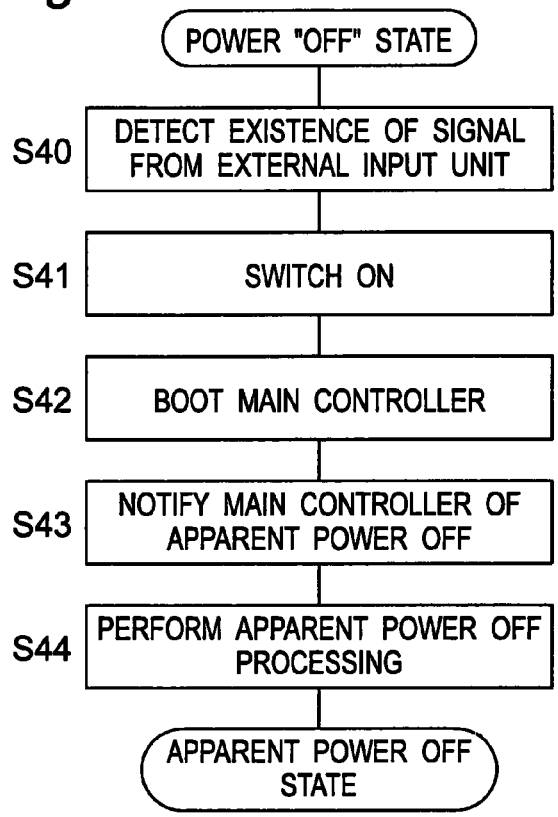
FIG. 6 is a diagram showing a procedure for changing the recording/reproducing apparatus of the present invention from the power "off" state to the "apparent power-off" state.

Transfer of the recording/reproducing apparatus 1 from the power "off" state to the "apparent power-off" state is described with reference to FIG. 6. Such transfer is made because when the television 11 is in the power "on" state, the recording/reproducing apparatus 1 transfers to the "apparent power-off" state that enables fast power-on processing. Here, the "apparent power-off" state literally means a state in which the power supply state in the recording/reproducing apparatus 1 is almost equal to the power "on" state, while the apparatus 1 is seen apparently "power-off" state, when seen from the user.

The timer controller 3 detects whether or not a signal is inputted from the monitor output unit 111 of the television 11 to the external input unit 31 of the recording/reproducing apparatus 1 (S40). When the television 11 is switched from the power "off" state to the power "on" state, the monitor output unit 111 starts to output video and audio signals received from the tuner of the television. When the external input unit 31 detects inputs of signals from the monitor output unit 111 of the television 11 (YES in S40), the timer controller 3 turns on the switch 5 (S41). Power is supplied to the main controller 2 to start boot of the main controller 2 (S42). Boot processing of the main controller 2 is as described above. After completion of boot of the main controller 2, the main controller 2 is notified of "apparent power-off" (S43). Upon reception of the notification, the main controller 2 performs "apparent power-off" processing (S44). "Apparent power-off" processing is as described above. Thus, the recording/reproducing apparatus 1 becomes in the "apparent power-off" state.

3.4 Transfer from "Apparent Power-Off" State to Power "on" State

Figure 7:
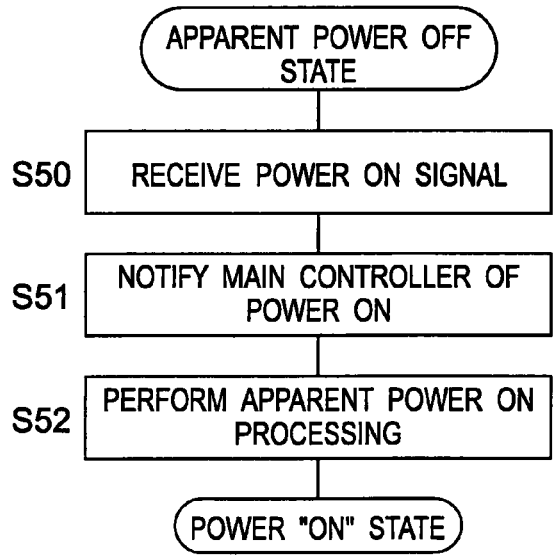
FIG. 7 is a diagram showing a procedure for changing the recording/reproducing apparatus of the present invention from the "apparent power-off" state to the power "on" state.

Transfer of the recording/reproducing apparatus 1 from the "apparent power-off" state to the power "on" state is described with reference to FIG. 7.

In the "apparent power-off" state, when the power button on the remote controller 12 or the recording/reproducing apparatus body is depressed, the power signal is transmitted to the IR input unit 32. The IR input unit 32 receives the power signal as the power-on signal since the current state is the "apparent power-off" state (S50). The timer controller 3 notifies the main controller 2 of power-on (S51). The main controller 2 executes "apparent power-on" processing (S52). "Apparent power-on" processing is processing for transferring the recording/reproducing apparatus 1 from the "apparent power-off" state to the normal power "on" state, in which: indication about power is displayed "on"; and indication showing power-on state is displayed on the display panel of the recording/reproducing apparatus body. "Apparent power-on" processing includes processing in which: various buttons other than the power button on the remote controller 12 or the recording/reproducing apparatus body are accepted; and video and audio signals from the tuner 9 are outputted to the output unit 209; and indication for the start state is displayed on the display panel. Boot processing of the main controller 1 and start processing of the HDD 7 and the DVD drive 8 is not performed. Hence the recording/reproducing apparatus 1 becomes in the power "on" state.

As described above, according to the present embodiment, transfer from the "apparent power-off" state to the power "on" state, as in the normal power-on processing, boot processing of the main controller 1 and start processing of the HDD 7 and the DVD drive 8 are not performed. Therefore start time can be greatly reduced. When the power button of the remote controller 12 or the recording/reproducing apparatus body is depressed, the recording/reproducing apparatus 1 can become in the power "on" state instantly.

3.5 Transfer from "Apparent Power-Off" State to Power "Off" State

Figure 8:
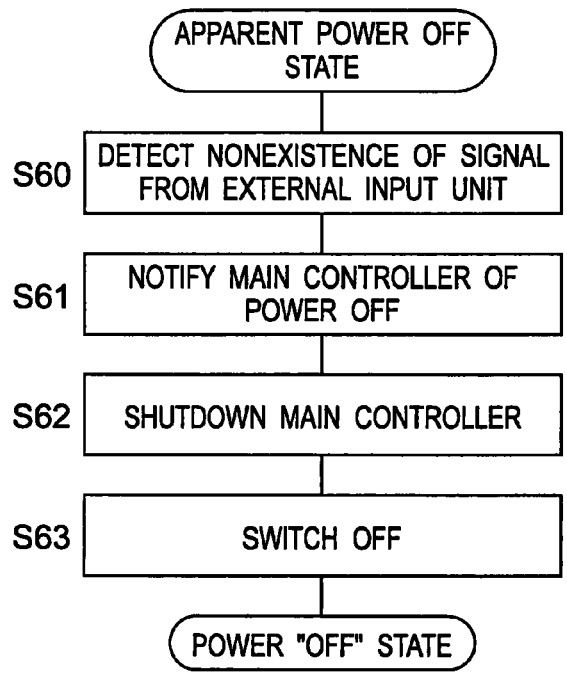
FIG. 8 is a diagram showing a procedure for changing the recording/reproducing apparatus of the present invention from the "apparent power-off" state to the power "off" state.

Transfer from the "apparent power-off" state to the power "off" state is described with reference to FIG. 8. When the television 11 is changed from the power "on" state to the power "off" state, the recording/reproducing apparatus 1 is changed to the normal power "off" state to reduce standby power, rather than maintaining of the state (apparent power-off state) of enabling fast power-on processing. The reason why the state of enabling fast power-on processing need not be maintained is because it is predicted that the recording/reproducing apparatus 1 would not be powered on for a while, after the television 11 is powered off based on the user's intention.

When the power of the television 11 is changed from the "on" state to the "off" state, no signal is outputted from the monitor output unit 111 and no input signal is detected by the external input unit 31 of the recording/reproducing apparatus 1. In the "apparent power-off" state of the recording/reproducing apparatus 1, the timer controller 3 judges that no input signal is detected by the external input unit 31 (S60) and notifies the main controller 2 of power-off (S61). Then the main controller 2 performs shutdown processing (S62). This processing is the same as the above-described processing in step S13 in FIG. 5. Upon reception of the shutdown completion notification from the main controller 2, the timer controller 3 turns off the switch 5 (S63). This causes power supply to the main controller 2 to be shut down to bring the recording/reproducing apparatus 1 into the power "off" state.

3.6 Operation at Programmed Recording

Operation when programmed recording of the recording/reproducing apparatus 1 of the present embodiment is set is described below. The recording/reproducing apparatus 1 has been provided with programmed recording information such as programmed recording start time, programmed recording end time, and information on a program to be recorded.

3.6.1 Operation at Start of Programmed Recording

Figure 9:
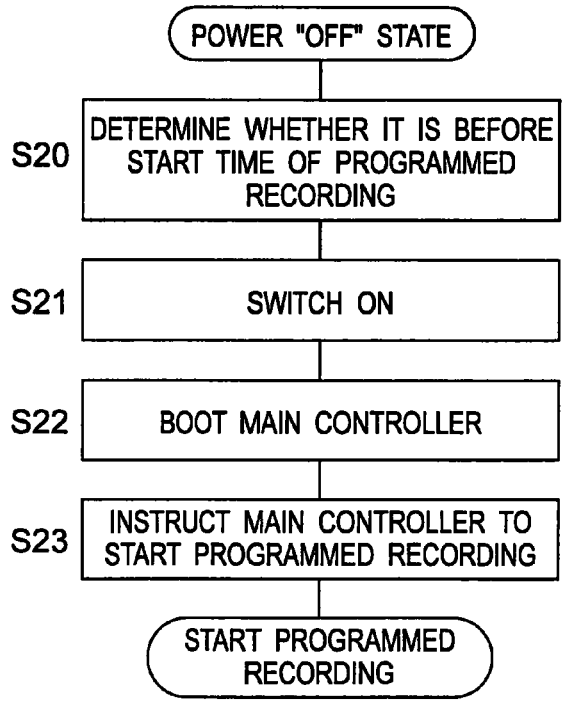
FIG. 9 is a diagram showing a procedure for changing the recording/reproducing apparatus of the present invention from the power "off" state to start of programmed recording.

Processing for starting programmed recording of the recording/reproducing apparatus 1 in the power "off" state is described with reference to FIG. 9.

In the power "off" state of the recording/reproducing apparatus 1, the timer controller 3 performs, all the time, determination of before programmed recording start time (S20). In the determination of before programmed recording start time, it is judged whether the current time (the point of time at judgment) is immediately before the programmed recording start time. Specifically, it is determined whether or not the current time reaches a predetermined time before the programmed recording start time. For example, whether or not the current time reaches one minute before the programmed recording start time is judged.

When the current time reaches the predetermined time before the programmed recording start time, the start processing for start recording is performed. In the start processing, the timer controller 3 turns on the switch 5 first (S21). This causes power to be supplied to the main controller 2 to start boot of the main controller 2. Then boot processing of the main controller 2 is performed (S22). The contents of the processing are the same as step S3 in FIG. 4. After completion of the boot processing of the main controller 2, the timer controller 3 sends a recording start command to the main controller (S23). Thus the main controller 2 starts programmed recording.

3.6.2 Operation at End of Programmed Recording

Figure 10:
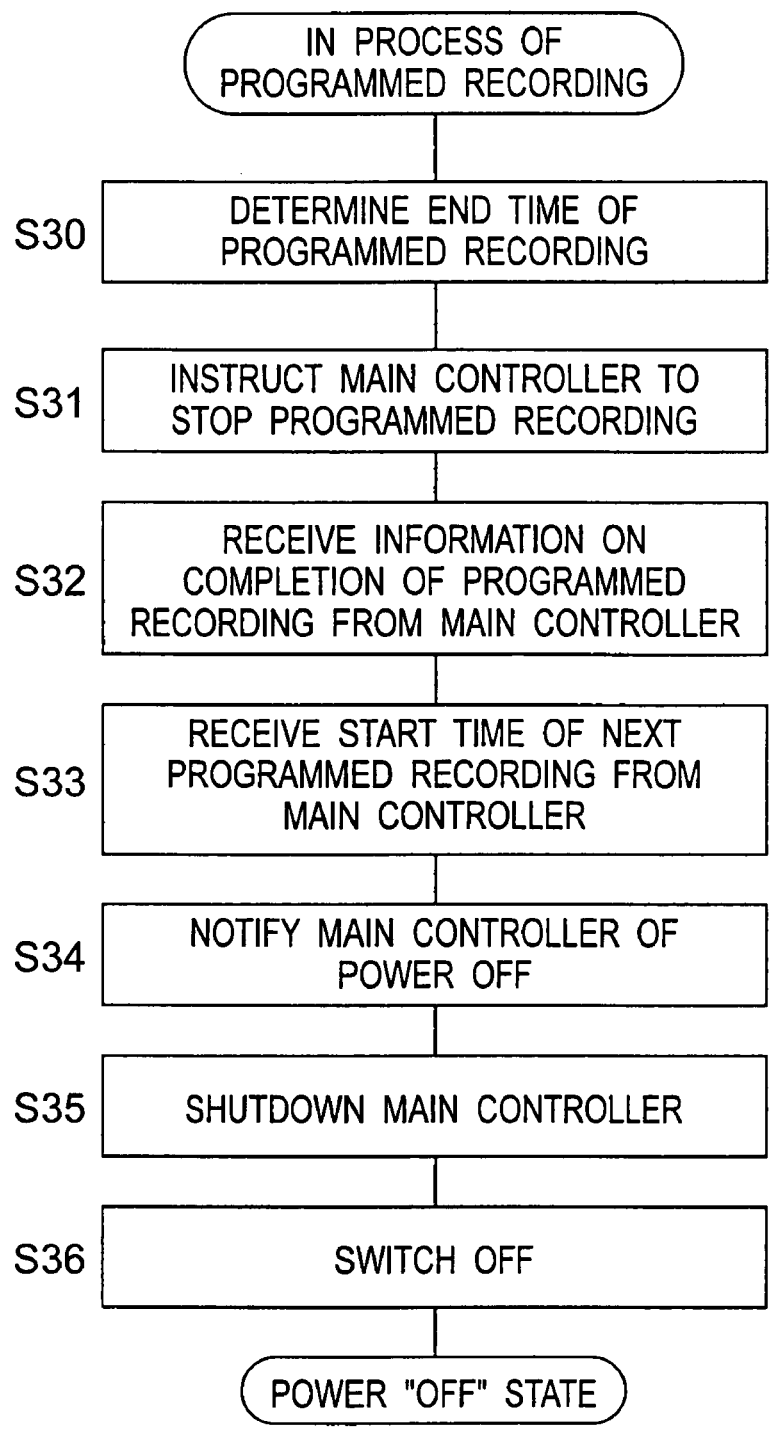
FIG. 10 is a diagram showing a procedure for changing the recording/reproducing apparatus of the present invention from an executing state of programmed recording to the power "off" state.

Processing of the recording/reproducing apparatus 1 which ends a programmed recording operation and transfers to the power "off" state is described with reference to FIG. 10.

The timer controller 3 always performs determination of programmed recording end time, during the programmed recording operation (S30). In the determination, whether or not the current time (the point of time at judgment) reaches the programmed recording end time is determined. The programmed recording end time can be extended even in the middle of the programmed recording operation, when it is judged that the program has been extended due to an extra-inning baseball game, for example. When the current time reaches the programmed recording end time, a recording stop command is given to the main controller 2 (S31). Upon reception of the recording stop command, the main controller 2 performs a recording stop processing. When the recording stop processing is completed, the main controller 2 notifies the timer controller 3 of completion of recording stop. The timer controller 3 receives the recording stop completion from the main controller 2 (S32).

Then, the main controller 2 searches for a programmed content which is to be programmed-recorded next from plural programmed contents and then notifies the timer controller 3 of the programmed recording start time of the searched content. The timer controller 3 receives the next programmed recording start time from the main controller 2 (S33). The timer controller 3 notifies the main controller 2 of power-off (S34). The main controller 2 performs shutdown processing of it self according to the notification of power-off from the timer controller 3 (S35). This processing is the same as processing in step S14 in FIG. 5. The timer controller 3 that has received notification of shutdown completion from the main controller 2 turns off the switch 5 (S36). Thus the power supply to the main controller 2 is shut down and the recording/reproducing apparatus 1 becomes in the power "off" state.

4. Effects

As described above, the recording/reproducing apparatus of Embodiment 1 is controlled to transfer to the "apparent power-off" state when the recording/reproducing apparatus 1 is powered off during the power of the television is "on", enabling fast power-on operation thereafter. Further, the recording/reproducing apparatus 1 is controlled to transfer to the power "off" state when the recording/reproducing apparatus 1 is powered off during the power of the television is "off", lowering standby energy.

There is considered the conventional recording/reproducing apparatus of which power consumption of 3.2 watts during standby state and 27 watts during power "on" state and of which power-on operation is not fast. When the recording/reproducing apparatus is controlled to be in the "apparent power-off" state all the time (that is, the state in which power consumption in the power "on" state is consumed all the time) in order to achieve fast power-on operation, the power consumption is 27 watts.

On the contrary, according to the recording/reproducing apparatus 1 of the present embodiment, average power consumption per day is about 7.2 watts, when it is assumed that, for instance, television viewing time per day is four hours, power consumption of 27 watts is consumed only for about four hours per day, and power consumption in the remaining non-viewing time for 20 hours is 3.2 watts. That is, although the conventionally fast power-on operation consumes 27 watts, according to the present embodiment the power consumption can be reduced to 7.2 watts.

The reason why the operation (transferred state) of the recording/reproducing apparatus 1 is changed depending on the power-on/off of the television 11 is because it is considered that the user typically uses the television 11 whenever using the recording/reproducing apparatus 1. The recording/reproducing apparatus 1 that does not have a display unit does not enable screen display for setting without the television 11. The user typically uses the television 11, except for programmed recording operation, whenever using the recording/reproducing apparatus 1. When the user uses the recording/reproducing apparatus 1 and both the television 11 and the recording/reproducing apparatus 1 are in the power "off" state, it is considered that the user turns on the television 11 first. Except for immediately after the power of the television 11 is "on", power-on of the recording/reproducing apparatus 1 of the present embodiment can be expected to be started fast.

Immediately after power-on of the television 11, it is not expected that the recording/reproducing apparatus 1 starts fast. There is no merit in starting the recording/reproducing apparatus 1 faster than the television 11, since display cannot be done on the television 11 before the television 11 starts. Thus the recording/reproducing apparatus 1 need not be started faster than the television 11. Generally, time to use the television 11 is longer than that of the recording/reproducing apparatus 1. In using the recording/reproducing apparatus 1, when the user powers on the apparatus 1, the possibility that the power of the television 11 may be "on" is higher than the possibility that the power of the television 11 may be "off". Accordingly, upon power-on of the recording device 1, it is considered that the frequency in which both the recording/reproducing apparatus 1 and the television 11 are in "off" state is lower than the frequency in which only the recording/reproducing apparatus 1 is in "off" state.

From the above-described points, according to the present embodiment, in many cases, the user can start the recording/reproducing apparatus 1 fast. The recording/reproducing apparatus 1 does not always turn on all processing units to make start time shorter. When the television 11 is "off", power in normal standby state is required and thus remarkable increase in power consumption during standby (standby energy) can be suppressed.

5. Modifications

In the present embodiment, although the external input unit 31 is described to input video and audio signals, either of video and audio signals may be inputted.

In the present embodiment, start of the HDD 7 and the DVD drive 8 is executed in boot processing of the main controller 2 (see step S42 in FIG. 6) in transfer from the power "off" state to the "apparent power-off" state. However start of the HDD 7 and the DVD drive 8 may not be executed in the boot processing of the main controller 2 but be executed in "apparent power-on processing" (step S52 in FIG. 7) in the processes transferring from the "apparent power-off" state to the power "on" state. In that case, the following controls can be considered. The "apparent power-on" processing may be completed without waiting for start completion of the HDD 7 and the DVD drive 8. When a recording command comes immediately after the recording/reproducing apparatus 1 is in the power "on" state, recording is started even though the HDD 7 and the DVD drive 8 are still being started. Until the start of the HDD 7 and DVD drive 8 completes, data may be stored to a buffer memory, such as a semiconductor memory.

It is described that stop of the HDD 7 and the DVD drive 8 is executed in the shutdown processing of the main controller 2 (S62 in FIG. 9) in transfer from the "apparent power-off" state to the power "off" state. Instead, it may be executed in the "apparent power-off" processing (S17 in FIG. 5) in transfer from the power "on" state to the "apparent power-off" state. That is, the HDD 7 and the DVD drive 8 may be controlled to be in the start state only when the recording/reproducing apparatus 1 is in the power "on" state. In the power "off" state and the "apparent power-off" state, the HDD 7 and the DVD drive 8 may be controlled to be in the stop state. As described earlier, data may be stored on a buffer memory such as a semiconductor memory, from when the recording is started while the HDD 7 and the DVD drive 8 are being started-up until the starting processing of the HDD 7 and the DVD drive 8 is completed. In this case, the effect of fast power-on operation of the recording/reproducing apparatus 1 cannot be lost. This arrangement allows the HDD 7 and the DVD drive 8 to be stopped even in the "apparent power-off" state, and thus Power consumption of the HDD 7 and the DVD drive 8 can be reduced.

In the present embodiment, an output signal from the monitor output unit 111 of the television 11 inputted via the external input unit 31 is used to determine the power "on"/"off" states of the television 11. Other signals may be used to perform the determination. For instance, the remote controller 12 may be provided with a power button for a television, and a remote control signal from the power button for a television may be received by the IR input unit 32 of the recording/reproducing apparatus 1 and the state of power-on/off of the television 11 may be determined based on the received signal. Thus the present embodiment can be embodied in the same manner without connecting the external input unit 31 to the television 11. The television 11 may be provided with the IR output unit 113. A signal including information about the state of power-on/off of the television 11 may be transmitted from the IR output unit 113, the signal is received by the IR input unit 32 of the recording/reproducing apparatus 1, and the state of power-on/off of the television 11 may be determined based on the received signal. Using the IR in this manner, the television 11 is in conjunction (associated) with the recording/reproducing apparatus 1. Hence, without being limited to power control as in the present embodiment, control of the television 11 and control of the recording/reproducing apparatus 1, such as recording programmed and input switching, can be associated with each other for operation.

The device in conjunction with the state of power-on/off of the recording/reproducing apparatus 1 is not limited to the television. Other equipment, such as an equipment having a monitor output unit, an equipment having a remote controller, or an equipment having an IR signal transmission function, may be used.

Embodiment 2

Figure 11:
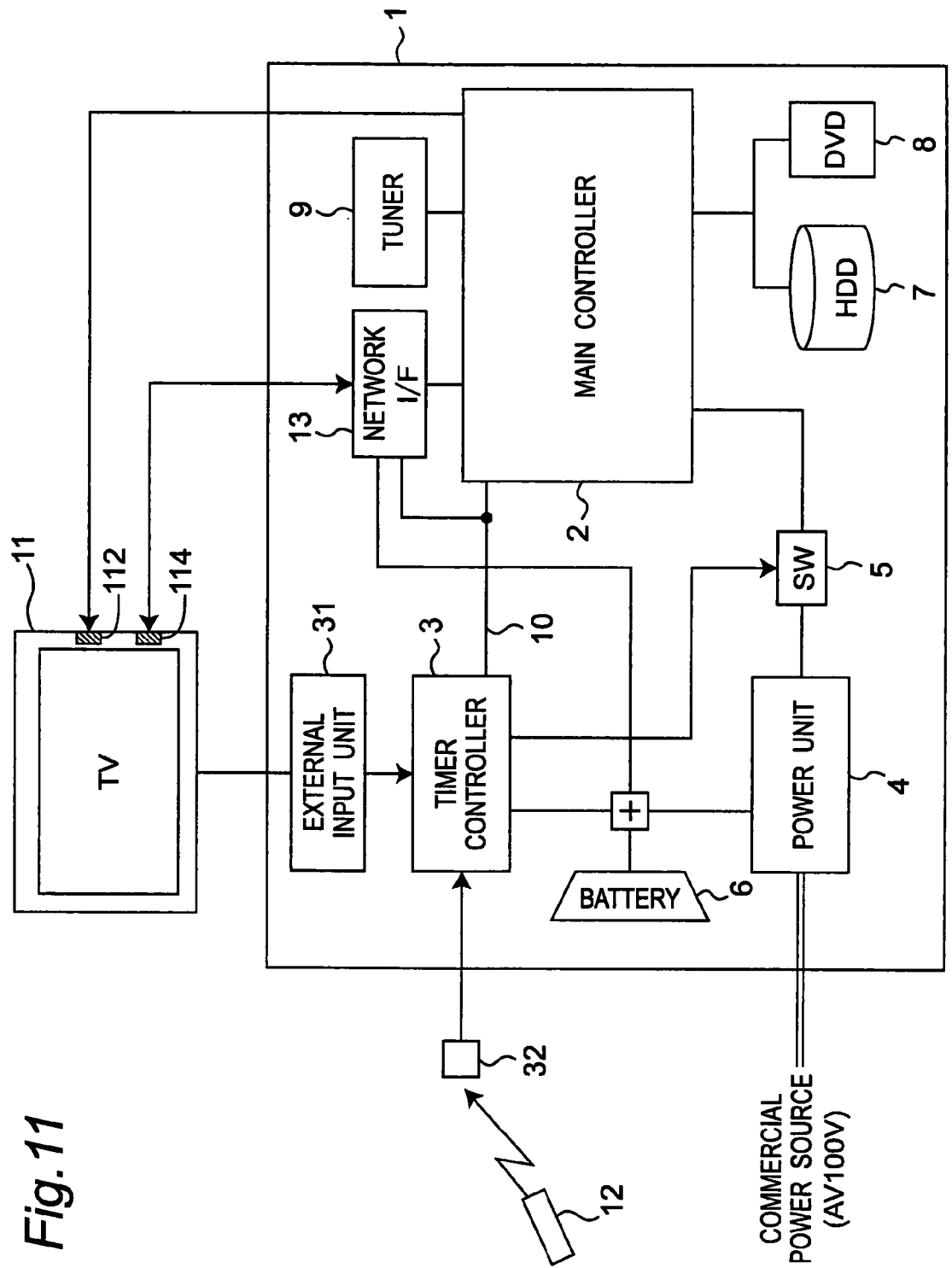
FIG. 11 is a block diagram of the entire system including connection between a recording/reproducing apparatus and television, according to Embodiment 2 of the present invention.

Embodiment 2 of the present invention is described with reference to FIG. 11. The recording/reproducing apparatus 1 shown in FIG. 11 has a net interface unit 13 in addition to the configuration shown in FIG. 1. As in the timer controller 3, power is supplied from the power unit 4 and the battery 6 to the net interface unit 13. In particular, when the power unit 4 is in power-failure, the power is supplied from the battery 6. The net interface unit 13 is connected to the communication unit 10 and can communicate with the timer controller 3 and the main controller 2.

The television 11 has a net connection unit 114 connected to the net interface unit 13. The net connection unit 114 can communicate with the net interface unit 13. Communication processing between the television 11 and the recording/reproducing apparatus 1 is enabled. Other configuration is the same as the configuration in FIG. 1 of Embodiment 1.

The television 11 transmits, to the net interface unit 13 of the recording/reproducing apparatus 1 via the net connection unit 114, information on the state of power-on/off of the television 11, that is, power information of transition from "off" to "on" or "on" to "of", and the "on" state.

On the other hand, the recording/reproducing apparatus 1 uses power information of the television 11 received or detected from the net interface unit 13 to control the state of power-on/off of the recording/reproducing apparatus 1.

When the power of the television 11 is switched from "off" to "on" during the power "off" state of the recording/reproducing apparatus 1, the net interface unit 13 detects the switching from the received power information, and then sends the timer controller 3 an instruction to transfer to the "apparent power-off" state. In the flowchart in FIG. 6 of Embodiment 1, processing in step S40 is replaced with the above processing to execute the same control as in Embodiment 1.

When the power of the television 11 is switched from "on" to "off" during the "apparent power-off" state of the recording/reproducing apparatus 1, the net interface unit 13 detects the switching from the received power information and then sends the timer controller 3 an instruction to transfer to the power "off" state. In the flowchart in FIG. 8 of Embodiment 1, processing in step S60 is replaced with the above processing to execute the same control as in Embodiment 1.

When the recording/reproducing apparatus 1 is in the power "on" state and the television 11 is in the "on" state, the net interface unit 13 detects the power "on" state from the received power information and then sends the timer controller 3 an instruction to transfer to the "apparent power-off" state. In the flowchart in FIG. 5 of Embodiment 1, processing in steps S11 and S12 is replaced with the above processing to execute the same control as in Embodiment 1.

When the recording/reproducing apparatus 1 is in the power "on" state and the power of the television 11 is in the "off" state, the net interface unit 13 detects the power "off" state from the received power information and then sends the timer controller 3 an instruction to transfer to the power "off" state. In the flowchart in FIG. 5 of Embodiment 1, processing in steps S11 and S12 is replaced with the above processing to execute the same control as in Embodiment 1.

As described above, provision of the net interface unit 13 and the net terminal unit 114 allows the same effect as that described in Embodiment 1 to be obtained. The net interface unit 13 and the net terminal unit 114 may be Ethernet or IEEE1394. They may be HDMI (High Definition Multimedia Interface). They may be various communication means, such as modem means, serial communication, infrared communication, radio frequency communication, power line communication, and coaxial cable communication. Arbitrary means capable of communicating with the television 11 can be used.

The net interface unit 13 may be a network using commercial power source supplied to the power unit 4 as a transmission path (power line communication). The equipment in conjunction with the state of power-on/off of the recording/reproducing apparatus 1 is not limited to the television 11. Arbitrary equipment connectable to the network can be used.

When the communication means is HDMI, CEC (Consumer Electronic Control) can be used. At this time, a CEC signal may be directly connected to the timer controller 3 not via the net interface unit 13 (only via the connector portion of the HDMI).

Hence control devices which are linked by using the communication means such as the net interface unit 13 allows various device control for plural devices, such as power control, recording programmed, and input switching, like the above embodiments.

Embodiment 3

Embodiment 3 of the present invention is described with reference to FIG. 12. The recording/reproducing apparatus 1 shown in FIG. 12 has an illumination detector 33 connected to the timer controller 3 in place of the external input unit 31 of the configuration shown in FIG. 1. The illumination detector 33 has an illumination sensor for detecting an illumination.

Figure 12:
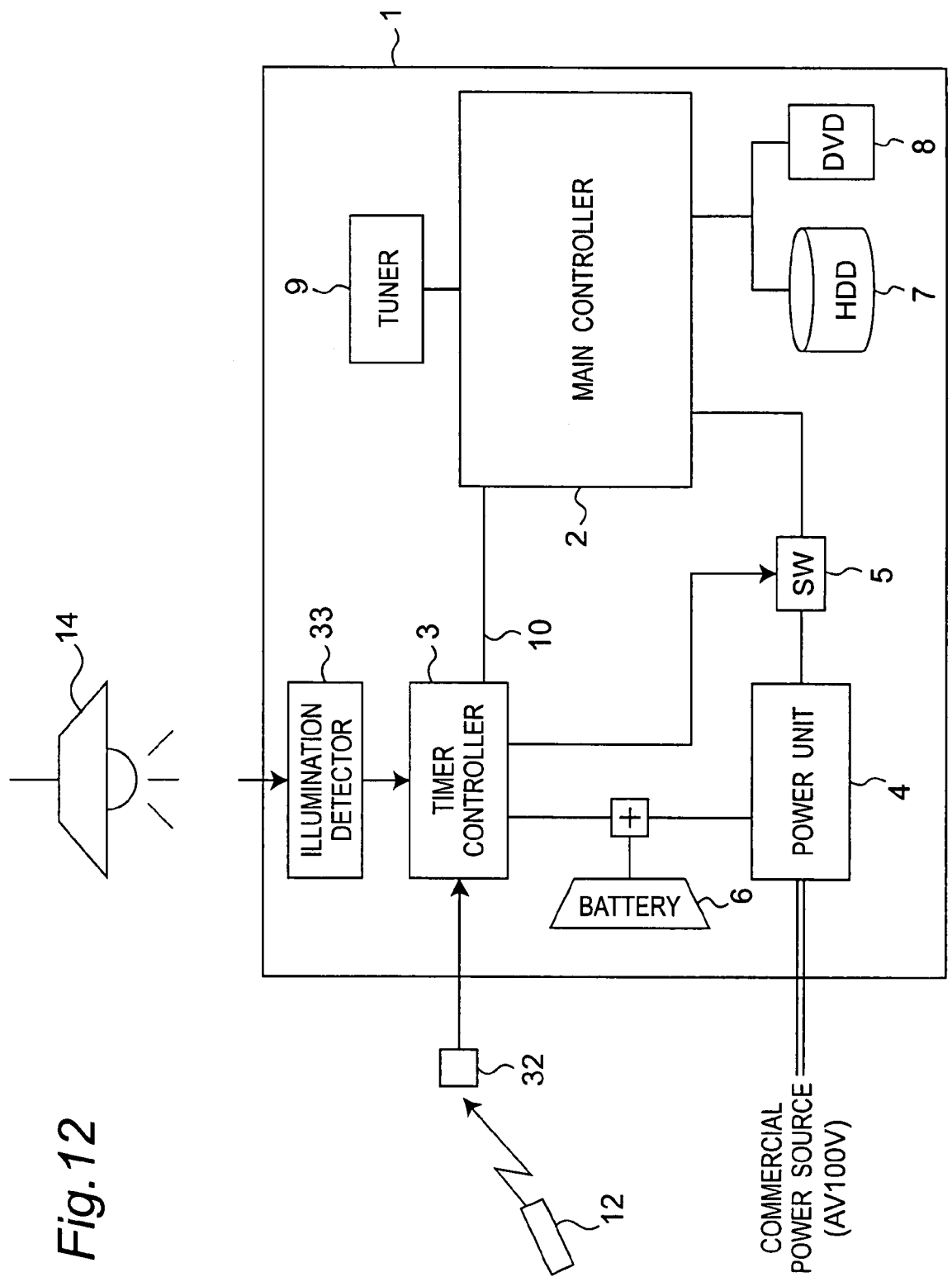
FIG. 12 is a block diagram of the entire system of a recording/reproducing apparatus according to Embodiment 3 of the present invention.

FIG. 12 shows a lighting equipment 14 with the recording/reproducing apparatus 1. The lighting equipment 14 is attached as a lighting device in a room in which the recording/reproducing apparatus 1 is installed. Typically, the power of the lighting equipment 14 is turned "on" when a person enters the room to use it and is turned "off" when the person exits the room.

The illumination detector 33 of the recording/reproducing apparatus 1 can detect and determine "on" or "off" of the power of the illumination equipment 14. "On" or "off" of the power of the illumination equipment 14 is replaced with "on" or "off" of the power of the television 11 described in Embodiment 1. Thus the recording/reproducing apparatus 1 can be operated as in Embodiment 1.

That is, when the illumination equipment 14 is "on", power-on operation of the recording/reproducing apparatus 1 can be changed fast. Standby energy of the recording/reproducing apparatus 1 when the illumination equipment 14 is "off" can be smaller than that in the "apparent power-off" state.

In many cases, when the recording/reproducing apparatus 1 is used, it is considered that illumination in the room in which the recording/reproducing apparatus 1 is installed is increased. When the user operates or uses the recording/reproducing apparatus 1, it is considered that fast power-on operation is required. It is assumed that the illumination equipment 14 is "on" for about eight hours per day, power consumption of 27 watts is consumed only for about eight hours per day, and power consumption of the remaining 16 hours is 3.2 watts. Average power consumption per day is about 11.1 watts. That is, the conventionally fast power-on operation is executed so that power consumption becomes 27 watts. However, according to the present embodiment, power consumption can be reduced to 11.1 watts. In the description of the present embodiment, power control of the recording/reproducing apparatus 1 is associated with "on" and "off" of the lighting equipment 14. However power control of the recording/reproducing apparatus 1 may be associated with other electric equipment. For instance, it may be in conjunction with a room air conditioner, a low, covered table with a heat source underneath, and a stove. In this case, a temperature detection unit or other sensors may be used in place of the illumination detector and the communication means as described in Embodiment 2 may be used. According to the present embodiment, a household electrical appliance such as illumination equipment can be used as an external equipment by providing a suitable sensor.

Embodiment 4

Embodiment 4 of the present invention is described. The configuration of the recording/reproducing apparatus of the present embodiment is the same as that shown in FIG. 1. In the present embodiment, the external input unit 31, the monitor output unit 111, and the IR output unit 113 are not always necessary.

In the foregoing embodiments, an example which controls transfer from the power "off" state to the "apparent power-off" state and transfer from the "apparent power-off" state to the power "off" state of the recording/reproducing apparatus 1 based on the state of power-on/off of other equipment. In the present embodiment, the recording/reproducing apparatus 1 learns time at which the user turns on or off the recording/reproducing apparatus 1 and then sets start time or end time of the "apparent power-off" state based on the learned time. The recording/reproducing apparatus 1 automatically changes the state of power-on/off thereof according to the set start time and end time.

Learning of the recording/reproducing apparatus 1 is described. For instance, at power-on by the user depressing the power button on the remote controller 12 or the recording/reproducing apparatus body (including transfer from the apparent power-off state to the power "on" state), power-on time is learned. At power-off (including transfer from the power "on" state to the apparent power-off state), power-off time is learned. Various learning methods, such as statistical processing, can be considered. For instance, the power-on time and the power-off time in a histogram may be simply summed, and then the most distributed time may be used or the totaled time may be averaged. Alternatively, latest (last) operation time may be set to learned values of the power-on time and the power-off time.

Figure 13A:
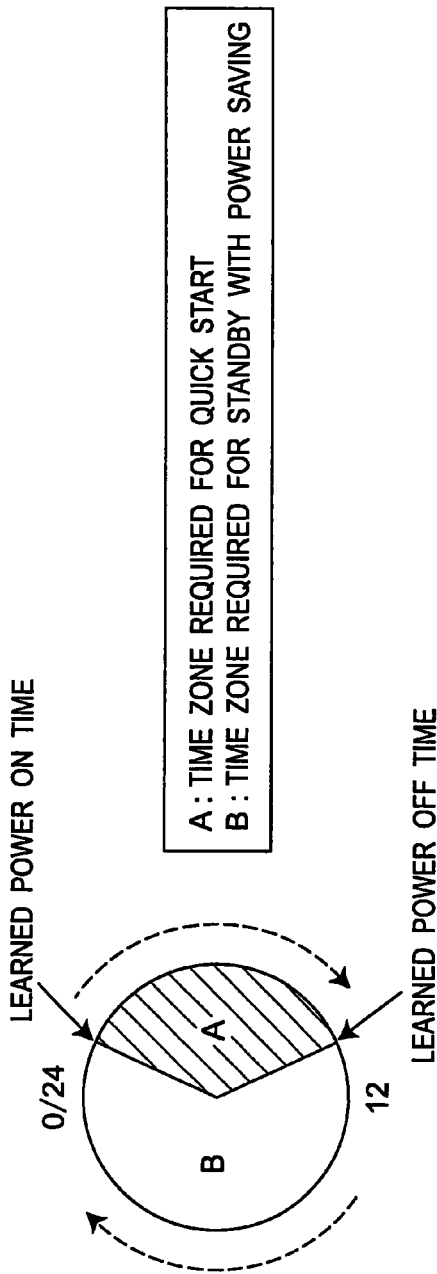
FIGS. 13A and 13B are diagrams showing transition between the power "off" state, the "apparent power-off" state, and the power "on" state of the recording/reproducing apparatus according to Embodiment 4 of the present invention.

As shown in FIG. 13A, the recording/reproducing apparatus 1 sets a time zone A from the learned power-on time to the power-off time and a time zone B from the learned power-off time to the power-on time. The time zone A is a time zone in which the possibility that the recording/reproducing apparatus 1 is used is high and fast start is desired. The time zone B is a time zone in which the possibility that the recording/reproducing apparatus 1 is not used is high and power saving standby is desired. The recording/reproducing apparatus 1 sets the learned power-on time to start time of the apparent power-off state and then sets the learned power-off time to end time of the apparent power-off state.

Figure 13B:
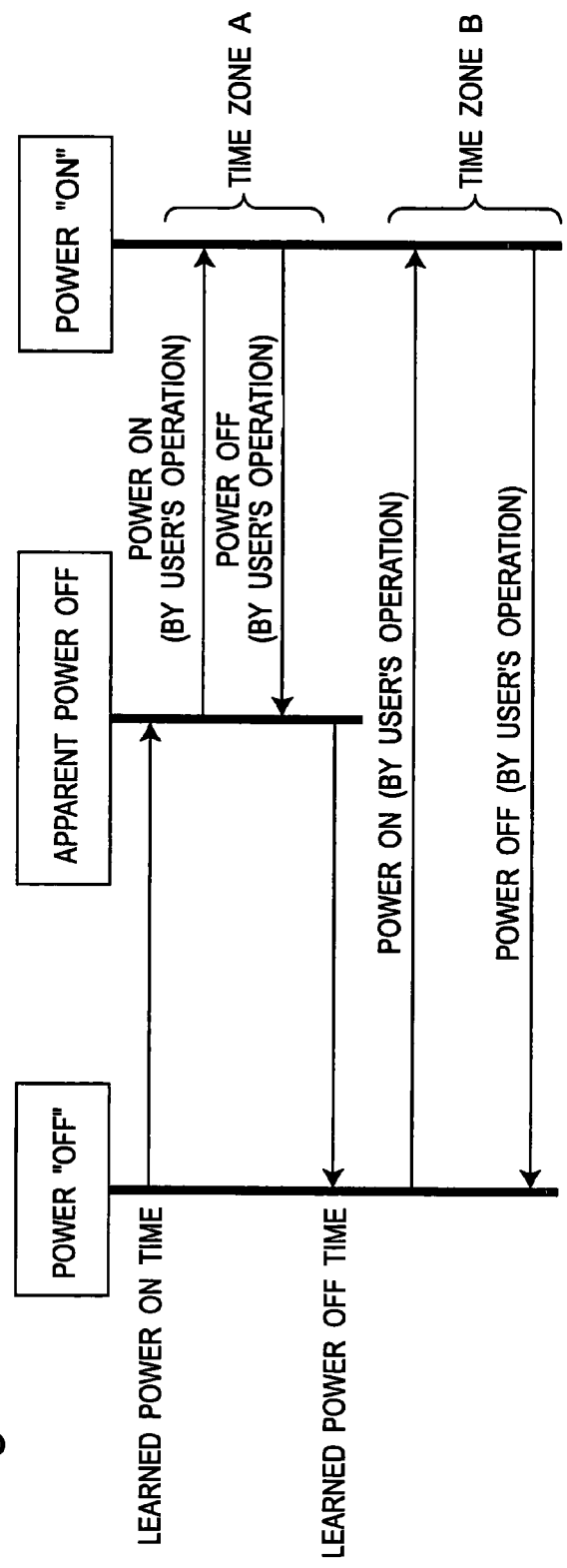

The timer controller 3 of the recording/reproducing apparatus 1 determines whether the current time is in the time zone A or the time zone B and changes the states of power-on/off, as shown in FIG. 13B, depending on the time zone to which the current time belongs. In the time zone A, when there is no operation by the user, the recording/reproducing apparatus 1 is controlled to the "apparent power-off" state. When there are power-on and power-off operations by the user, the recording/reproducing apparatus 1 transfers between the power "on" state and the "apparent power-off" state. In the time zone B, the recording/reproducing apparatus 1 transfers between the power "on" state and the power "off" state according to the power-on and power-off operations by the user.

When there is no user operation and the current time reaches the learned power-on time in the power "off" state, the recording/reproducing apparatus 1 transfers automatically to the "apparent power-on" state. When there is no user operation and the current time reaches the learned power-off time in the "apparent power-off" state, the recording/reproducing apparatus 1 is automatically transfers to the power "off" state.

Transfer from the power "off" state to the "apparent power-off" state is described with reference to FIG. 14.

In the initial state of the recording/reproducing apparatus 1 (that is, the state immediately after the user buys and installs the recording/reproducing apparatus 1), the recording/reproducing apparatus 1 does not have information on start time and end time in the "apparent power-off" state. When the recording/reproducing apparatus 1 is used for the first time and the power button of the remote controller 12 or the recording/reproducing apparatus body is depressed, the recording/reproducing apparatus 1 is started according to the sequence described in FIG. 4 of Embodiment 1 and becomes in the power "on" state. When the power button of the remote controller 12 or the recording/reproducing apparatus body is depressed in the power "on" state, the recording/reproducing apparatus 1 stops the operation according to the sequence (steps S10 to S15) described in FIG. 5 of Embodiment 1 to become in the power "off" state. Processing in steps S11 and S12 in FIG. 5 is not performed.

When the first power "on" and "off" operations are executed by the user, the timer controller 3 of the recording/reproducing apparatus 1 learns the time, sets the learned power-on time to start time of the "apparent power-off" state, and sets the learned power-off time to end time of the "apparent power-off" state. The first learning operation is thus executed. The operation thereafter is described below with reference to FIG. 14.

When the recording/reproducing apparatus 1 in the power "off" state, determination of apparent power-off start time is performed (S80). In this determination, whether or not the current time is within the range between the start time and the end time (that is, within the time zone A) is determined. When the current time is within the time zone A, the switch 5 is turned on to make the apparatus 1 transfer to the apparent power-off state (S81). The subsequent processing of steps S81 to S84 is the same processing of steps S41 to S44 in FIG. 6 described in Embodiment 1.

Transfer from the "apparent power-off" state to the power "off" state is described based on FIG. 15.

When the recording/reproducing apparatus 1 is in the "apparent power-off" state, determination of apparent power-off end time is performed (S90). In this determination, whether or not the current time is outside the range from the start time to the end time (the time zone A), that is, whether or not the current time is within the time zone B, is determined. When the current time is within the time zone B, the timer controller 3 notifies the main controller 2 of power-off to make the apparatus 1 transfer to the power "off" state (S91). The subsequent processing from steps S91 to S94 is the same as processing from steps S61 to S63 in FIG. 8 described in Embodiment 1. The timer controller 3 sets the next apparent power-off start time (S92).

As described above, the recording/reproducing apparatus automatically transfer to the power "off" state and the "apparent power-off" state based on the learned power-on time and power-off time.

As described above, according to the present embodiment, the power-on or power-off time is learned so that the recording/reproducing apparatus 1 can change the state of power-on/off by itself without being in conjunction with the external equipment. In the recording/reproducing apparatus 1 of the present embodiment, the start time and end time of the programmed recording are not learned. Other operation related to power-on and power-off operations by the user may be learned.

Embodiment 5

Embodiment 5 of the present invention is described with reference to FIG. 16. The system configuration of the present embodiment is basically the same as the configuration shown in FIG. 1. In the present embodiment, the recording/reproducing apparatus incorporates a digital tuner in place of the tuner 9 and the television also incorporates the digital tuner.

Figure 16:
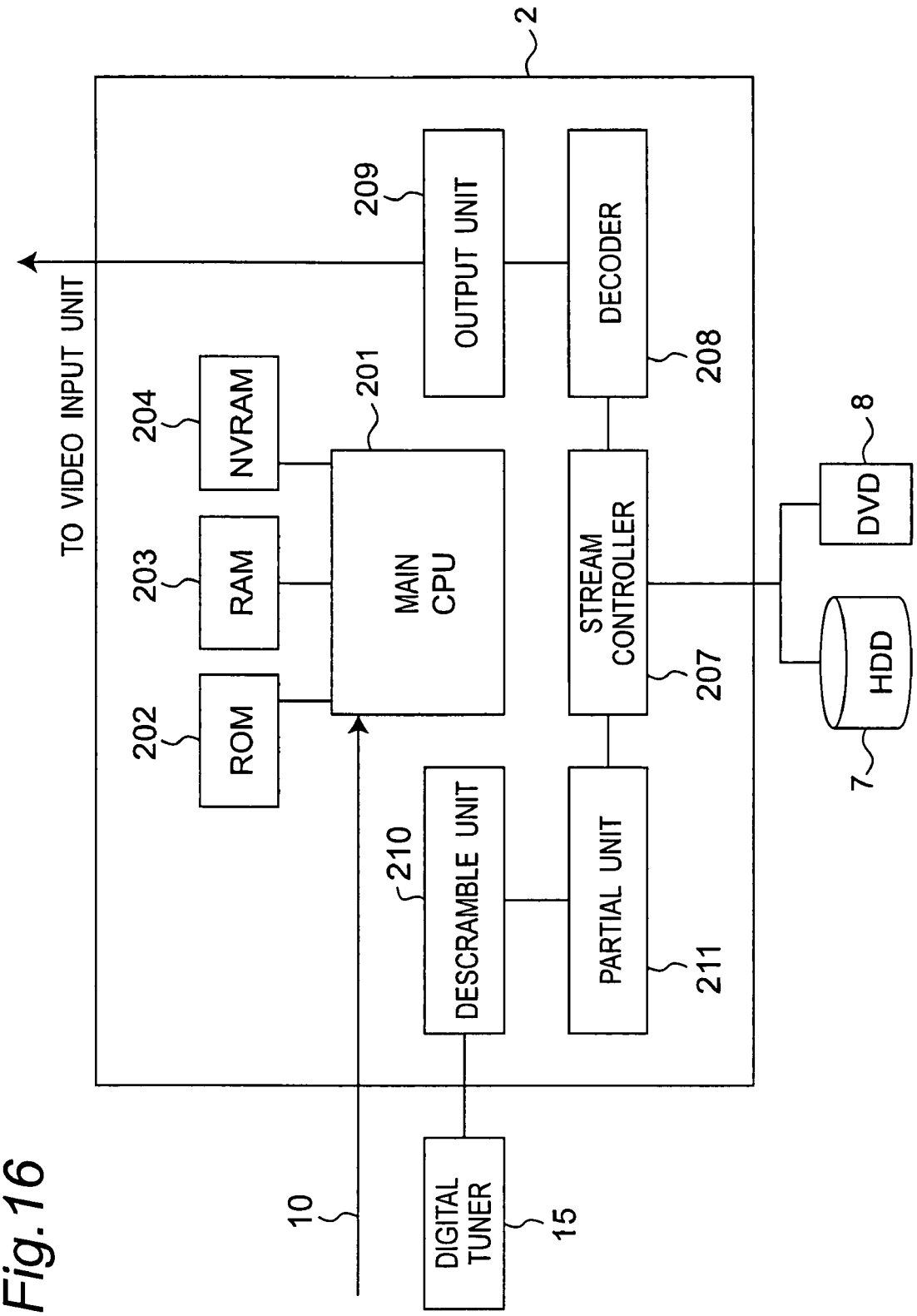
FIG. 16 is a block diagram of the main controller of the recording/reproducing apparatus according to Embodiment 5 of the present invention.

FIG. 16 shows the detailed configuration of the main controller of the present embodiment. The main controller 2 is connected to a digital tuner 15 and has a descramble unit 210 and a partial unit 211 in place of the digital converter 206 and the encoder 205 in the configuration shown in FIG. 1.

The digital tuner 15 receives a digital broadcast wave, selects a desired channel, and decodes the digital broadcast wave. The decoded signal is a scrambled transport stream. The descramble unit 210 descrambles the scramble of the transport streams outputted from the digital tuner 15. The partial unit 211 extracts only some necessary streams from the transport streams descrambled by the descramble unit 210 ("partializing"). The stream controller 207 controls the partialized streams to store them on the HDD 7 and the DVD drive 8 or read them. Other configurations 201 to 209 are the same as those shown in FIG. 2.

The television 11 of the present embodiment incorporates a digital tuner for receiving digital broadcast. In the digital broadcast, there is a system as means for upgrading (updating) software for controlling a household electrical appliance receiving a broadcast, in which software corresponding to each device is delivered, each device receives this, and the self-software is upgraded. The television 11 of the present embodiment is also equipped with the system. The recording/reproducing apparatus 1 of the present embodiment is also equipped with the system.

However, when delivering software corresponding to each device over a digital broadcast, each device that receives the software always needs to monitor or detect whether or not the software for itself is delivered. To monitor always the received contents from the digital tuner 15, the recording/reproducing apparatus 1 need to keep the main controller 2 operating all the time even when the state of power-on/off of the recording/reproducing apparatus 1 is "off". In this case, power consumption during standby of a device, such as the recording/reproducing apparatus 1, is increased. Especially, when there are plural devices that receive a digital broadcast and all the devices are standby in the energized state all the time, total power consumption is very large in the devices.

The present embodiment can solve the above problems and can reduce power consumption during standby in the device having an automatic software upgrading function. The detail is described below with the recording/reproducing apparatus 1 taken as an example.

In digital broadcast, prediction information that notifies deliver time of upgrading software is superimposed on a transport stream to be transmitted. The television 11 receives the prediction information and can previously recognize time to obtain the software.

The television 11 recognizes the deliver time of the software corresponding to the recording/reproducing apparatus 1 from the prediction information. When the current time is a predetermined time before the deliver time, the currently receiving video and audio are outputted from the monitor output unit 111. The video and audio outputs are inputted to the external input unit 31 of the timer controller 3. Following the procedure after step S40 in FIG. 6 described in Embodiment 1, when the recording/reproducing apparatus 1 is in the power "off" state, it transfers to the "apparent power-off" state. After that, the main controller 2 of the recording/reproducing apparatus 1 becomes in the energized state. Thus the recording/reproducing apparatus 1 can detect that the current time is immediately before the corresponding software is delivered over the broadcast, and start an operation of receiving the corresponding software upon start of delivering of the corresponding software, achieving reliable upgrade of the software. At this time, the recording/reproducing apparatus 1 can be controlled to the power "off" state just before the deliver of the software is started. Accordingly the recording/reproducing apparatus 1 need not be controlled to the power "on" state all the time to receive software, reducing standby energy.

According to the present embodiment, in download for upgrading the software, the recording/reproducing apparatus is controlled to transfer from the power "off" state to the "apparent power-off" state immediately before the download from the television. This allows the recording/reproducing apparatus 1 to cope with irregular download, reducing power consumption during standby.

The television 11 may stop the video and audio outputs after an elapse of a predetermined time after completion of deliver of the software (that is, after an elapse of time required for upgrading the software). This allows the recording/reproducing apparatus 1 to be controlled to the power "off" state after completion of upgrading the software. Thus standby energy can be reduced.

Also in the present embodiment, as a trigger for changing the recording/reproducing apparatus 1 to the apparent power-off state, in place of the video and audio signals from the monitor output unit 111, notification by the IR output unit 113 or notification by the net interface unit 13 may be used as described in Embodiments 1 and 2.

The television 11 may detect delivery prediction information for, not only the software for the recording/reproducing apparatus 1, but also software for the television 11 or software for another device connected or registered to the television 11 to control the another device into the apparent power-off state. The another device can upgrade the software even though the main controller of the device is not in the energized state all the time for receiving the software delivered from a broadcast, and accordingly power consumption in the entire system can be reduced.

As described above, according to the present embodiment, when software corresponding to each device from a broadcast is delivered, the television detects it and sends a notification to make each device transfer to the apparent power-off state, thus reducing standby energy of the entire system.

Miscellaneous

In Embodiment 1, as the standby mode in the power "off" state, aside from the normal power "off" state, the standby mode in the "apparent power-off" state is prepared. The switching between the power "off" state and the "apparent power-off" state is done in conjunction with the external equipment (e.g., television). With this, it is described that speeding up of start-up of power supply and reduction in power consumption during standby can be achieved at the same time. Associating the recording/reproducing apparatus with the external equipment can be done in a method of associating the recording/reproducing apparatus with a video or audio output from the external equipment, a method of associating the recording/reproducing apparatus with a signal of the remote controller that controls the external equipment, or a method of associating the recording/reproducing apparatus with the external equipment by outputting the IR signal from the external equipment.

In Embodiment 2, the recording/reproducing apparatus is provided with the net interface unit 13 in conjunction with the external equipment. In Embodiment 3, by taking the lighting equipment as an example of the external equipment, the conjunction method using the illumination detector (illumination sensor) 33 is described. In Embodiment 4, the recording/reproducing apparatus is changed between the power "off" state and the "apparent power-off" state by learning the power-on or power-off time of the device without being associating with the external equipment. In Embodiment 5, the recording/reproducing apparatus incorporates the digital tuner 15. In download for upgrading the software, immediately before download from the television, the recording/reproducing apparatus transfers from the power "off" state to the "apparent power-off" state. This makes it possible to cope with both of irregular download and reduction in power consumption during standby at the same time.

In the above-described embodiments of the present invention, a BD (Blu-ray Disc) drive may be used in place of the DVD drive. The HDD and the DVD drive (or the BD drive) need not be always active during the "apparent power-off" state. In the state that the HDD and the DVD drive (or BD drive) are being stopped, they may be started upon coming of a recording or reproducing instruction. The HDD and the DVD drives (or BD drive) may be simply in a stop state, or power supply to the HDD and the DVD drives may be stopped (stop of power supply is more effective for reducing power consumption).

Further, in the case of a recording instruction, the record data may be backed up until the HDD and the DVD drives (or the BD drive) is started, by temporarily recording data to be recorded to a semiconductor memory.

In the foregoing Embodiments, an example of a combination of the television and the recording/reproducing apparatus is described, which is not limited to this. Associating operation between other AV devices may be used. Two or more devices may be in conjunction with each other. The television may control standby mode of the powers of plural recording/reproducing apparatuses and AV devices. In Embodiment 3, an example of a combination of the lighting equipment and the recording/reproducing apparatus is described. A combination of a different household electrical appliance and an AV device may be used. Plural AV devices may be in conjunction with a household electrical appliance. In other words, any AV device may be used, provided that one AV device has first and second standby modes and that switching between the standby modes of the one AV device is controlled based on an output from the other AV device. In the present invention, the AV device is not limited to the above-described recording/reproducing apparatus and the television, and a broadcast reception device having a digital broadcast reception function is considered.

Although specific embodiments of the present invention are described above, many other modified examples, corrections, and other utilization would be apparent to those skilled in the art. The present invention is not limited to the particular disclosure and can be limited only by the attached claims. This application relates to Japanese Patent Application No. 2005-114140 (filed on Apr. 12, 2005), the disclosure of which is incorporated herein by reference.

The present invention can be applied for an application that can realize fast power start-up and reduce standby power in an AV device, such as a hard disk recorder or a DVD recorder, capable of programmed recording of a television broadcast.

The invention claimed is:

1. A video/audio processing device for processing video and/or audio signals, comprising:
   a controller configured to control a state of power-on/off of the video/audio processing device, the controller having a first standby mode, and a second standby mode that has power consumption larger than that of the first standby mode, in a power-off state of the video/audio processing device,
   wherein the controller:
   1) automatically updates a power-on time and a power-off time by learning a user's operation,
   2) when power off operation is provided by the user to the video/audio processing device, determines whether the time at which power off operation is provided is in a range from the power on time to the learned power off time, based on the learned power on time and the learned power off time, and
   3) switches a mode to the second standby mode when the time at which power off operation is provided is in the range, or switches a mode to the first standby mode when the time at which power off operation is provided is not in the range.

2. The video/audio processing device according to claim 1, wherein the second standby mode is a mode which enables faster start of the video/audio processing device than the first standby mode when power-on operation is provided by a user.

* * * * *